Aug. 3, 1943.  W. A. RAY  2,325,878
FLUID CONTROL VALVE
Filed Oct. 28, 1939
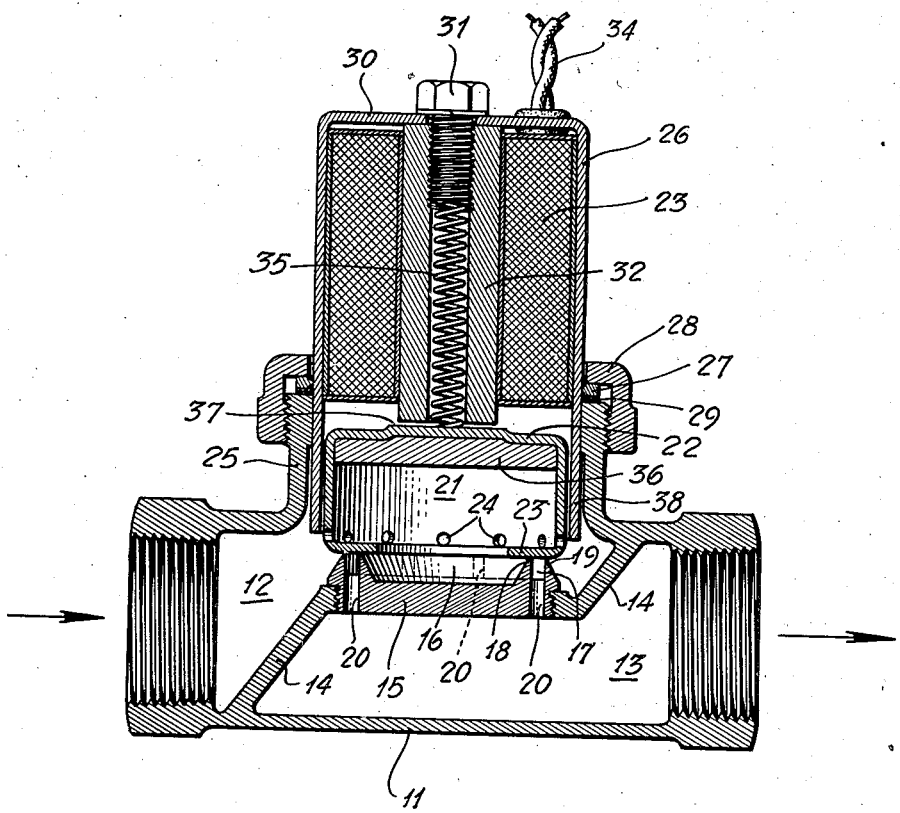
WILLIAM A. RAY,
Inventor.
By John H. Rouse,
Attorney Patented Aug. 3, 1943

2,325,878

UNITED STATES PATENT OFFICE 2,325,878

FLUID CONTROL VALVE

William A. Ray, Glendale, Calif.

Application October 28, 1939, Serial No. 301,817

7 Claims. (Cl. 137—139)

My present invention relates to electromagnetically operated fluid control valves.

An object of my invention is the provision, in a fluid control valve of the direct operated type, of an electromagnetic operator wherein the magnetic circuit is so arranged that minimum power is required for operation of the valve.

Another object is the provision, in such a valve, of a shell-like valve member of magnetic material.

Another object is to improve the magnetic circuit by providing magnetic means extended to surround the side wall of said shell.

Another object is the provision of a valve of the character described which is simple, efficient, and economical to manufacture.

Other objects and advantages of my invention will be found in the description, the drawing, and the appended claims.

For complete understanding of the invention, reference may be had to the following detailed description and accompanying drawing, wherein the single figure is a sectional view of a valve embodying my invention.

In the drawing, the numeral 11 indicates a valve casing having an inlet 12 and an outlet 13 separated by a partition 14, wherein is threaded a valve seat member 15. The valve seat member is provided with a central recess 16 and an annular recess 17 to form concentric inner and outer valve seats 18 and 19, respectively. Connecting the recess 17 with the outlet 13 are openings 20.

Cooperable with the valve seats 18 and 19 is a valve member 21 comprising a cylindrical shell of magnetic material having a closed upper wall 22 and a lower marginal wall 23, the latter wall being conveniently so formed by spinning, or in a punch press with the aid of a collapsing die. Openings 24 are provided in the lower portion of the side wall of the shell which permit fluid communication between the inlet 12 and the area adjacent the inner valve seat 18. It will thus be seen that, when the shell is raised by electromagnetic means which will hereinafter be described, fluid can flow from the inlet 12, across both the inner and the outer seats 18 and 19, into the recess 17 and thence through openings 20 into the outlet 13. As the shell, when sensitive operation of the valve is required, may only be raised 0.010 to 0.015 inch, this feature permits almost twice the amount of flow as when a single annular seat is employed.

An upper extension 25 of the casing provides an opening for the reception of a housing 26 of magnetic material. This housing is secured in the casing by a ring 27, brazed or welded to the housing, which is clamped to the upper surface of the casing extension by a threaded collar 28. Shims 29 are provided between the ring and the casing whereby the position of the housing with respect to the casing may be adjusted.

Secured to the upper end wall 30 of housing 26, by a screw 31, is a hollow core member 32, surrounding which is a coil member 33 provided with terminals 34 for connection to a source of current. A spring 35, compressed between screw 31 and the valve member 21, biases said member to closed position.

For sensitive operation, the spring 35 is arranged to exert a relatively light force and, under some conditions, this spring may be omitted and the valve member gravity biased as by a weight 36. Or, as shown, both spring and gravity bias may be employed. The outer surfaces of the upper and lower wall of the valve member 21 should be accurately and smoothly finished, preferably by lapping. To facilitate that operation, the center portion 37 of the upper wall of the valve member is formed to extend above the surrounding surface so that approximately equal areas at the top and the bottom of the valve member are presented in lapping.

The valve member 21 is arranged to be freely slidable in the lower end portion 38 of the housing, and the circumferential surface of the member is preferably plated with a durable non-magnetic metal to provide a minute air gap between this surface and the inner wall of the housing.

It will be realized that, by the arrangement shown, a most efficient magnetic circuit is provided which is conducive to efficiency and sensitivity of operation, especially when the coil is supplied with direct current.

The magnetic members 21, 26 and 32 are preferably of an iron alloy having a high nickel content. Such an alloy has high permeability and low magnetic residual and is suitable for the deep-forming of the housing and the valve member. The screw 31 is preferably of iron and the spring 35 of non-magnetic material such as stainless steel.

Instead of turning the lower edge of the shell inward to form a marginal bottom wall, this wall may optionally be provided by a separate disk or washer, of material the same as or different to that of the shell, pressed into the lower end of the shell.

While I have herein shown and described a specific embodiment of my invention, I wish it to be understood that modifications may be made without departing from the spirit of my invention. I intend, therefore, that my invention be limited only by the scope of the appended claims.

I claim as my invention:

1. In a fluid control valve, a casing having an inlet and an outlet, a ported partition separating said inlet and said outlet and provided with a valve seat, a cylindrical housing of magnetic material secured in an opening in the upper wall of said valve casing, a coil mounted in the upper area of said housing, and a valve member cooperable with said seat and comprising a shell of magnetic material slidable in the lower portion of said housing and in good flux-transfer relation thereto.

2. In a fluid control valve, a casing having an inlet and an outlet, a ported partition separating said inlet and said outlet and provided with a valve seat, a housing of magnetic material secured in an opening in said valve casing and comprising a cylindrical member having an outer end wall, a core member within said housing and mounted on said end wall, an energizing coil in said housing and surrounding said core member, and a valve member cooperable with said seat and engageable with said core when the same is energized and comprising a shell of magnetic material slidable in the inner end of said housing and in good flux-transfer relation thereto.

3. In a fluid control valve, a casing having an inlet and an outlet, a ported partition separating said inlet and said outlet and provided with a valve seat, a housing of magnetic material secured in an opening in said valve casing and comprising a cylindrical member having an outer end wall, a core member within said housing and mounted on said end wall, an energizing coil in said housing and surrounding said core member, and a valve member cooperable with said seat and engageable with said core when the same is energized, said valve member comprising a shell of magnetic material having a cylindrical side wall and a bottom and a top end wall cooperable respectively with said seat and said core, the inner end of said housing extending beyond the free end of said core and so surrounding the side wall of said shell that it is in good flux-transfer relation thereto.

4. In a fluid control valve, a casing having an inlet and an outlet, a ported partition separating said inlet and said outlet and provided with a horizontal valve seat, a housing secured in an opening in the upper wall of said valve casing, said housing comprising a tubular member of magnetic material having a closed upper end of similar material, a core member in said housing and mounted on said upper end, the length of said core member being less than that of said housing, an energizing coil in said housing and surrounding said core member, and a valve member slidable in the lower end of said housing and comprising a shell of magnetic material having an upper and a lower end wall cooperable respectively with the lower end of said core and with said seat, said shell being in good flux-transfer relation to said housing.

5. In a fluid control valve, a casing having an inlet and an outlet, a ported partition separating said inlet and said outlet and provided with a valve seat, a cylindrical housing of magnetic material secured in an opening in the upper wall of said valve casing, a coil mounted in the upper area of said housing, and a valve member cooperable with said seat and comprising a cylindrical member of magnetic material slidable in the lower portion of said housing and in good flux-transfer relation thereto.

6. In a fluid control valve, a casing having an inlet and an outlet, a ported partition separating said inlet and said outlet and provided with a valve seat, a housing of magnetic material secured in an opening in said valve casing and comprising a cylindrical member having an outer end wall, a core member within said housing and mounted on said end wall, an energizing coil in said housing and surrounding said core member, and a valve member cooperable with said seat and engageable with said core when the same is energized and comprising a cylindrical member of magnetic material slidable in the inner end of said housing and in good flux-transfer relation thereto.

7. In a fluid control valve, a casing having an inlet and an outlet, a ported partition separating said inlet and said outlet and provided with a valve seat, a housing of magnetic material secured in an opening in said valve casing and comprising a cylindrical member having an outer end wall, a core member within said housing and mounted on said end wall, an energizing coil in said housing and surrounding said core member, and a valve member cooperable with said seat and engageable with said core when the same is energized, said valve member comprising a member of magnetic material having a cylindrical side wall and a bottom and a top end wall cooperable respectively with said seat and said core, the inner end of said housing extending beyond the free end of said core and so surrounding the side wall of said valve member that it is in good flux-transfer relation thereto.

WILLIAM A. RAY.